July 8, 1969

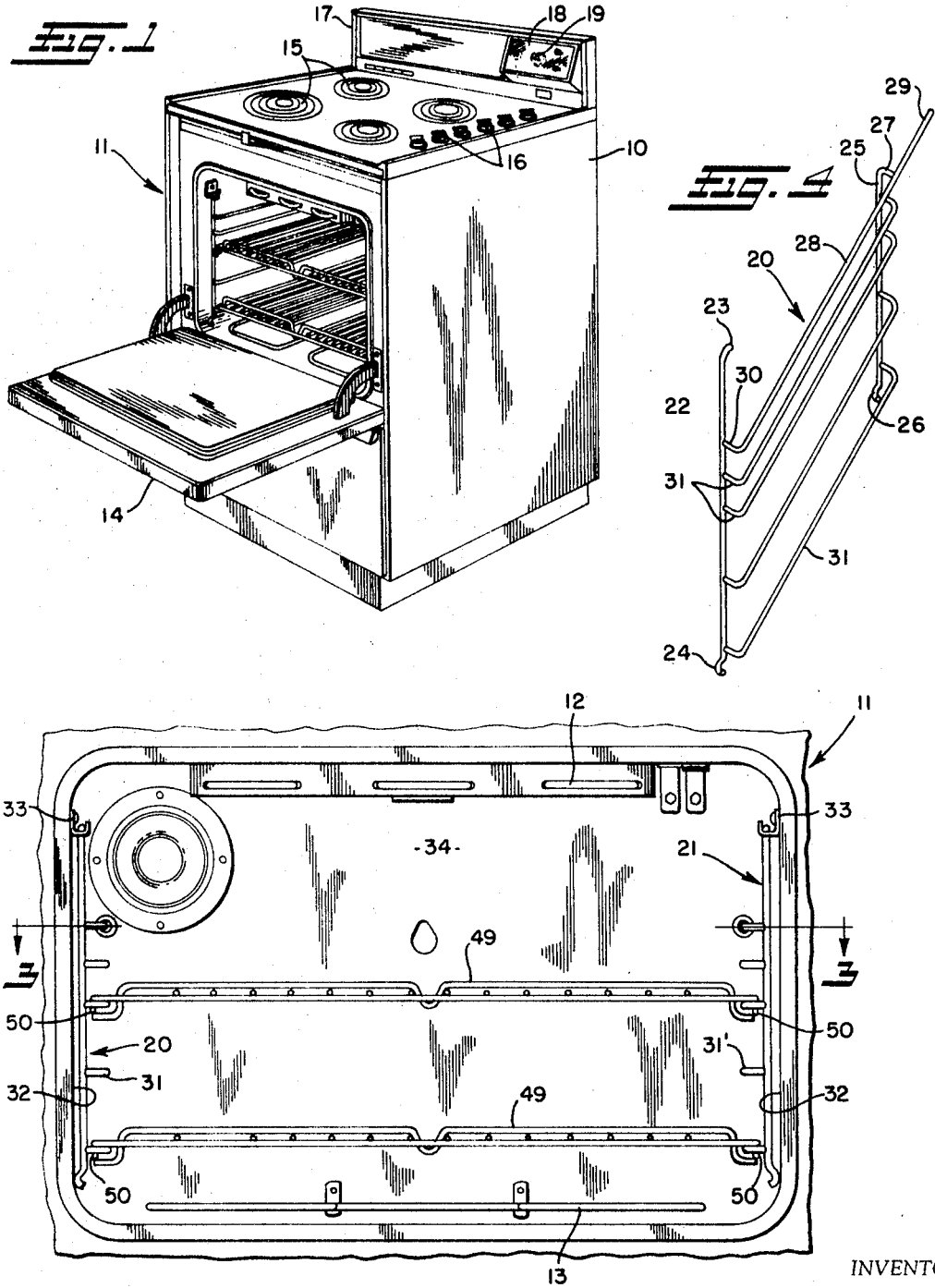

A. W. VONDERHAAR 3,454,744

OVEN RACK SYSTEM

Filed May 4, 1967

INVENTOR
ARTHUR W. VONDERHAAR

BY Oberlin, Maky, Donnelly & Renner
ATTORNEYS ial basic configuration, it is a primary object of the present invention to provide a novel and improved rack system designed especially for this type of oven.

United States Patent Office 3,454,744
Patented July 8, 1969

3,454,744
OVEN RACK SYSTEM
Arthur W. Vonderhaar, Mansfield, Ohio, assignor to The Tappan Company, Mansfield, Ohio, a corporation of Ohio
Filed May 4, 1967, Ser. No. 636,041
Int. Cl. F27d 23/00
U.S. Cl. 219—414    9 Claims

ABSTRACT OF THE DISCLOSURE

A system of Teflon-coated racks and rack supports removably installed in a cooking oven which is of self-cleaning type, wherein the cleaning is effected by heating the oven to a temperature substantially above the range normally applied for cooling and above about 750° F., and an interlock switch actuated by the rack system in the control of the oven so that the self-cleaning operation cannot take place while the rack system is installed.

This invention relates to an improved rack system for cooking ovens of the self-cleaning type.

These ovens as now commercially available are basically alike in that a cleaning cycle is provided for heating the oven to a temperature well above the range used normally for cooking to effect conversion of the food soils which accumulate on the interior surfaces of the oven liner. A temperature of about 750° F. has been established as a minimum for the cleaning action while the upper limit may be about 950° F. or even somewhat in excess of 1000° F. This is, more particularly, in contrast with the usual operating range of from about 150° F. to about 550° F. Most of the design attention in such ovens has therefore necessarily been directed to the problems of choice of materials suitable for the high temperature exposure, insulation, exhaust, safety and the like and, these requirements having been satisfactorily met in a commercial basic configuration, it is a primary object of the present invention to provide a novel and improved rack system designed especially for this type of oven.

An oven rack system according to the invention comprises one or more removable wire form racks which are generally of conventional mechanical design, together with glides or rack supports also formed separately of the oven and being removable with the racks. Two such glides are utilized in the oven installed respectively at the sides and providing the vertically spaced series of horizontal support surfaces on which the rack or racks can be selectively placed, whereby the integral forming of equivalent glide surfaces in the oven liner side walls as in conventional self-cleaning ovens is eliminated and these walls are much more simply and conveniently flat. The control for the heating of the oven is mechanically interlocked with this rack system in such manner that the high temperature cleaning cycle cannot be initiated while the system is installed in the oven. This interlock feature affords positive assurance of the rack removal, which is only recommended in conventional ovens to avoid the deterioration of the standard chrome plated racks which has been found to result from exposure to the high cleaning temperatures. The interlock feature of the new system, moreover, permits the racks, and preferably the glides as well, to be coated with a non-stick finish, such as the polytetrafluoroethylene marketed under the trademark Teflon of E. I. du Pont de Nemours and Co., whereby the cleaning of these components is greatly enhanced in accord with a further objective of the invention. It has been established that Teflon is stable over the nomal range of oven cooking temperatures, and this degree of stability is all that is required in the new interlocked system.

Other objects and advantages of the present invention will become apparent as the following description proceeds.

To the accomplishment of the foregoing and related ends the invention, then, comprises the features hereinafter fully described and particuarly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a cooking range equipped with an oven rack system in accordance with the present invention;

FIG. 2 is a fragmentary front view of the oven of this range, with the door removed for convenience of illustration;

FIG. 4 is a perspective view of one of the oven glides or rack supports used in the new system.

Figure 3:
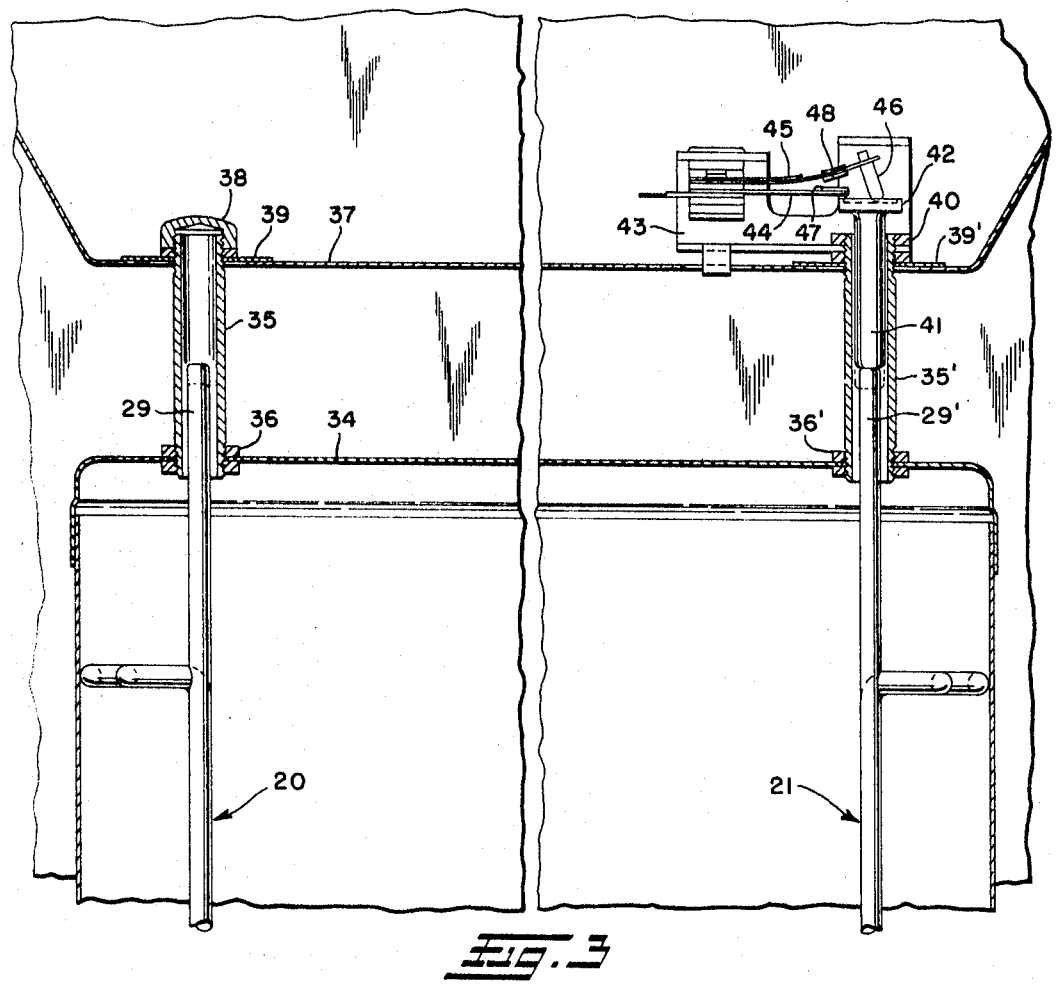
FIG. 3 is a broken horizontal section through the oven as viewed from the plane of the line 3—3 in FIG. 2 on an enlarged scale.
Figure 5:
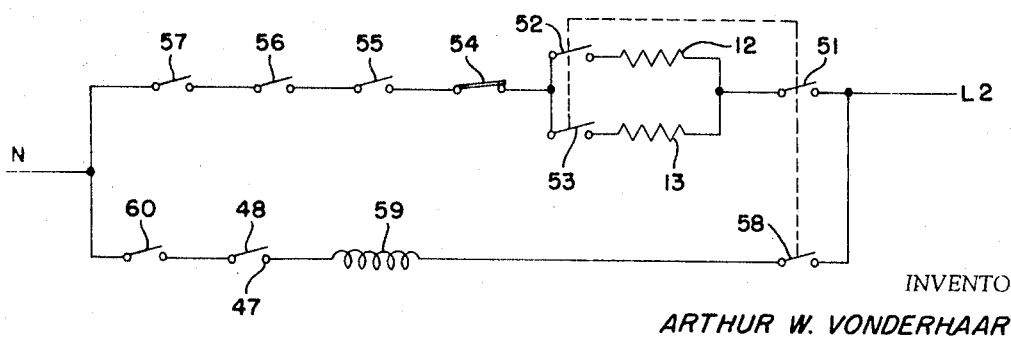
FIG. 5 is a simplified diagram showing the electric wiring of the oven.

Referring now to the drawings in detail, the cooking range illustrated is of conventional electric type, apart from the rack system within the oven to be described, and comprises a cabinet 10 in which the oven 11 is located. The oven contains the usual two sheathed electric resistance heating elements 12 and 13, respectively at the top and bottom of the cavity for broiling and baking when separately energized and, as will also later appear more clearly, for self-cleaning with simultaneous energization of both. The oven is further provided with a bottom hinged door 14 at the front of the range.

The top of this range includes four standard electric surface heaters 15, and there is a control section along the right side where a number of operating knobs 16 for the various controls are located. A backguard 17 extends across the rear of the top of the range and contains a further control section 18. The various controls, which regulate both the oven and the surface elements, are of course entirely conventional, and it will be sufficient to note particularly that the system of this illustrative range includes a selector switch 19 to establish the different conditions for operation of the oven, viz. broiling, baking and self-cleaning.

The new rack system used in this oven is shown as comprising left and right rack supports or glides designated generally by reference numerals 20 and 21 removably installed respectively at the sides of the oven liner. The left glide 20, all portions of which are made of wire, comprises a front or forward vertical 22 the upper end of which is bent rearwardly to form a hanger portion 23. The lower end is also bent, but as an outwardly curved section 24 for a purpose to be described. There is a rear vertical 25 having a similar lower end curved section 26 and being disposed parallel to the front vertical 22 at a spacing which is somewhat less than the depth of the oven. The rear vertical 25, however, is shorter than the front vertical and terminates in an inwardly bent upper end 27 which is joined to a horizontal wire 28 which extends from this joint both to the rear in a straight continuation section 29 and forwardly to a connection with the front vertical 22 through a bend 30 equivalent to that of the top 27 of the rear vertical, so that the wire 28 has its major extent spaced inwardly from the plane of the two verticals. The glide 20 is completed by further wires 31 also extending horizontally between the two verticals in spaced relation as shown, with the ends of all bent inwardly to the joints with the verticals to maintain the same inward spacing of the several horizontal extents thereof relative to the plane of the verticals.

It is of course obvious that the several horizontal wires 28, 31 form the supports for the racks to be used in the oven, and the glide 20 is dimensioned so as to extend over the major area of the oven liner left side wall 32. For support of the glide, this side wall is provided with a bracket 33 mounted in the upper forward corner region and shaped simply as a bifurcated upwardly facing channel to receive the top hanger 23 of the front vertical 22 of the glide. The top horizontal wire continuation 29 to the rear extends into a special socket formed in the rear wall 34 of the oven liner as shown most clearly in FIG. 3, with this socket basically comprising a tube 35 having a forward threaded end secured by a nut 36 in an opening in the wall 34. The tube 35 extends horizontally to the rear to and through an outer wrapper or cabinet wall 37. The space between the walls 34 and 37 will be filled with the usual thermal insulation for the oven, such as glass wool, not shown, and the rear end of the tube is closed by a nut cap 38 threaded on the end to the rear of the outer wall 37, with a wool retainer washer 39 preferably interposed between the nut cap and the wall as shown.

The right oven glide 21 is of the same design, but relatively reversed, with respect to the left and the comparable sections indicated by primed reference numerals. A second corresponding hanger bracket 33' is provided on the left liner wall 32' for glide 21. However, the rear wall socket associated with the right glide is not identical to that at the left, although it does comprise a similar tube, a forward end nut at the rear liner wall 34, and a wool retaining washer at the outer wall opening, as also shown by the primed reference numerals for these components.

The outer end of this right tube 35' is open and secured by a nut 40 which does not obscure such end. A spacer 41 made of electric insulating material is movable within the tube 35' and has an outer or rear recessed head 42. A bracket 43 is installed adjacent the projecting spacer 41, and this bracket mounts a single pole normally closed interlock switch comprising a first contact leaf 44 and a second cooperable contact leaf 45 having spring resilience and carrying an insulative button or stem 46 at its free end which bears against the head 42 of the spacer 41.

As shown in FIG. 3, the right glide continuation 29' normally engages the inner or forward end of the spacer 41 and pushes the spacer outwardly against the bias of the spring leaf 45 to hold the two leaf-carried contacts 47 and 48 separated. When this glide 21 is removed, the leaf 45 is free to return to its normal contact engaging condition, the spacer 41 moving freely forward in the tube 35' in this return action.

The oven rack system of course also includes a plurality of wire racks or shelves 49 for selective positioning in the oven on the glides 20, 21. The exact configuration of such racks is not of special significance, although it would preferably be desirable to include some restraint against the racks simply sliding freely forwardly from the glides. For example, front corner downturned stops 50 can be included to engage behind the curved front ends of the horizontal wires 29, 31 of the glides, so that the front edge of each rack when in place requires at least slight lifting preparatory to sliding withdrawal.

The simplified wiring diagram for the oven as shown in FIG. 4 includes in a first circuit, across the electric energy source represented by the conductors L2 and N, first selector switch contacts 51, the oven broil and bake elements 12 and 13 in parallel, with second and third selector switch contacts 52 and 53 respectively in series with each, and a number of additional switch contacts commonly in series connection with the two oven elements. Such further switch contacts in the first circuit comprise oven high temperature limit switch contacts 54, clock operated contacts 55, relay switch contacts 56, and contacts 57 of a door latch switch which close, as indicated, with the mechanical latching of the oven door.

A second circuit of the diagram, parallel with the first, comprises fourth selector switch contacts 58, a relay coil 59, the previously described rack interlock switch contacts 47, 48 and contacts 60 of a door switch, the last being closed with closure of the oven door.

This two-circuit diagram illustrates the oven self-cleaning operation only in which the broil and bake elements are simultaneously energized to heat the oven to a temperature within the previously indicated range of from about 750° F. to about 950° F. When the selector switch is set for this operation, all of its contacts 51–53, 58 are closed to energize both the first and second circuits of the diagram as described. The oven door will have been closed and latched by any suitable mechanical means, thereby to effect closure of the further contacts 60 and 57 respectively in the first and second circuits, the high temperature limit switch contacts responsive to the oven temperature will of course be closed, and the clock switch contacts 55 will close upon setting the range timer for the period selected for the cleaning operation as is conventional. All of these control features are basically known in available self-cleaning ovens, but the relay coil 59, its switch contacts 56, and the interlock switch 47, 48 are new and afford the desired interlock which precludes initiation of the self-cleaning stage of operation with the rack system installed in the oven. The relay contacts 56 are normally open and, as indicated earlier, the interlock contacts 47, 48 are normally closed but held open when the right oven glide is in place. Accordingly, the relay coil 59 cannot be energized with this glide installed and the relay contacts 56 remain open in the circuit of the oven elements. When this glide is removed, and of course the rack or racks in the oven must first be extracted to withdraw the glides, the interlock switch 47, 48 automatically closes, the coil is energized, and the contacts 56 close to complete the circuit for the oven elements 12 and 13.

It will be understood that there will be other circuits for energizing the oven elements separately to perform broiling and baking operations in the normal use of the oven and, these being conventional, they have not been illustrated. However, the separate circuits will necessarily at least bypass the relay contacts 56 of the interlock feature as disclosed for the self-cleaning operation.

It is believed that an interlock switch associated with only one of the two oven glides as disclosed is sufficient to insure the removal of the full system as a preliminary to initiating a cleaning cycle, but a second such switch could very readily be added in like association with the other glide and the two switches in series connection if desired. It has been standard to use racks and glides which are made of chrome plated wire, and such coatings may be applied to those herein illustrated and described, with the interlock feature thus protecting these coatings from the gradual erosion and deterioration which has been found to occur if such components are left in the oven during the cleaning cycle, to the extent that removal is expressly recommended in the instructions for the available self-cleaning ovens.

However, it is preferred in accordance with the present improvements that the racks be coated with a non-stick finish, such as the previously noted Teflon, since these elements also receive accumulations of food soils in the normal use of the oven. The exposure of the glides to such soiling is perhaps somewhat less than that of the racks, and these can be of the chrome-plated type with Teflon-coated racks, although Teflon coating of the glides as well would be preferred. Any non-stick finish which can safely be used in the oven over its normal range of cooking temperatures, such as the approximate 150° F. to 550° F. range set forth above, can thus be applied to further enhance the cleaning of these elements separately of the oven, such as in the kitchen sink, with the interlock switch in this case even more significant because of the tendency for such finishes, which are organic in nature, to decompose at the temperatures used for cleaning.

Other modes of applying the principle of the invention may be employed, change being made as regards the details described, provided the features stated in any of the following claims or the equivalent of such be employed.

I, therefore, particularly point out and distinctly claim as my invention:

1. A self-cleaning cooking oven comprising a cabinet having walls defining an oven cavity, heating means for said cavity, and circuit control means for said heating means selectively operable to control the heating means to effect cooking operations within a temperature range not exceeding about 550° F. and a heat cleaning operation at a substantially higher temperature; article-supporting means within the cavity including removable oven rack means for holding articles thereon to be heated selectively at different intermediate elevations in the cavity during such cooking operations, interlock switch means in circuit with said circuit control means, and means actuated by said rack means for operating the switch means to render said circuit control means unable to effect said heat cleaning operation when the oven rack means is in such an article holding position within the cavity.

2. The combination set forth in claim 1, wherein the rack means is coated with a non-stick organic finish.

3. The combination set forth in claim 1, wherein the rack means is coated with a non-stick finish comprised essentially of polytetrafluoroethylene.

4. The combination set forth in claim 1, wherein the article-supporting means further includes rack supports removably disposed respectively at the sides of the oven and having corresponding surfaces in vertically spaced relation to receive and removably support the rack means.

5. The combination set forth in claim 1, wherein the article-supporting means includes at least one separately formed glide means removably disposed at a side of the oven for the support of the rack means at such side, and said interlock means is responsive to the installation and removal of said glide means.

6. The combination set forth in claim 1, wherein the article-supporting means includes separately formed rack support means also removable from the oven, and said rack means is coated with an organic non-stick finish.

7. The combination set forth in claim 1, wherein the article-supporting means includes separately formed rack support means also removable from the oven, and said rack means and rack support means are coated with an organic non-stick finish.

8. The combination set forth in claim 7, wherein the interlock means is responsive to the installation and removal of said rack support means.

9. The combination set forth in claim 8, wherein the interlock means comprises switch means actuated by the rack support means.

References Cited

UNITED STATES PATENTS

| | | | |
|---|---|---|---|
| 2,107,173 | 1/1938 | Bauer | 219—413 X |
| 2,234,596 | 3/1941 | Heilman | 219—393 X |
| 2,291,359 | 7/1942 | Uhlrig et al. | 219—393 |
| 2,668,221 | 2/1954 | McCormick | 219—413 X |
| 3,176,118 | 3/1965 | Scott | 219—413 X |
| 3,214,567 | 10/1965 | Chisholm | 219—413 |

BERNARD A. GILHEANY, *Primary Examiner.*

H. B. GILSON, *Assistant Examiner.*

U.S. Cl. X.R.

219—393